(12) United States Patent
Wegner

(10) Patent No.: US 7,413,084 B2
(45) Date of Patent: Aug. 19, 2008

(54) METHOD AND SYSTEM FOR SEPARATING PARTICULATE MATTER

(76) Inventor: Paul C. Wegner, 1340 Eaton Ave., San Carlos, CA (US) 94070

( * ) Notice: Subject to any disclaimer, the term of this patent is extended or adjusted under 35 U.S.C. 154(b) by 435 days.

(21) Appl. No.: 11/254,600

(22) Filed: Oct. 19, 2005

(65) Prior Publication Data
US 2006/0081503 A1      Apr. 20, 2006

Related U.S. Application Data

(60) Provisional application No. 60/620,941, filed on Oct. 19, 2004.

(51) Int. Cl.
*B07B 4/00* (2006.01)
*B07B 7/00* (2006.01)

(52) U.S. Cl. ............... 209/139.1; 209/142; 209/148; 209/915

(58) Field of Classification Search ............. 209/12.1, 209/139.1, 142, 148, 915, 158, 725
See application file for complete search history.

(56) References Cited

U.S. PATENT DOCUMENTS

| | | | | |
|---|---|---|---|---|
| 3,409,131 A | * | 11/1968 | Petersen et al. | 209/143 |
| 3,842,461 A | * | 10/1974 | Wurster | 15/326 |
| 4,230,559 A | * | 10/1980 | Smith | 209/139.1 |
| 4,299,694 A | * | 11/1981 | Goodell | 209/139.1 |
| 4,754,869 A | * | 7/1988 | Hutchison et al. | 198/536 |
| 5,120,431 A | * | 6/1992 | Cordonnier | 209/135 |
| 6,244,446 B1 | * | 6/2001 | Schmittel | 209/157 |
| 7,237,679 B1 | * | 7/2007 | Hendrickson et al. | 209/638 |
| 2006/0081503 A1 | * | 4/2006 | Wegner | 209/17 |

* cited by examiner

*Primary Examiner*—Patrick Mackey
*Assistant Examiner*—Terrell H Matthews
(74) *Attorney, Agent, or Firm*—Sheridan Ross P.C.

(57) ABSTRACT

The present invention is directed to a system and method for continuously or substantially continuously separating particulate matter based on particle size and/or density of the matter. The system includes a separation chamber having a bottom portion disposed within a cavity of a rotatable bowl having fluid therein, preferably water. The internal cavity of the separation chamber is maintained under negative pressure such that fluid is drawn through the separation chamber at a predetermined velocity to separate the solids. Larger, dewatered and/or denser solids are directed to the cavity of the rotatable bowl and can be removed by rotation of the bowl while the smaller and/or less dense solids and fluid travel up through the separation chamber.

27 Claims, 1 Drawing Sheet

METHOD AND SYSTEM FOR SEPARATING PARTICULATE MATTER

CROSS-REFERENCE TO RELATED APPLICATIONS

The present invention claims priority from U.S. Provisional Application Ser. No. 60/620,941, filed Oct. 19, 2004.

FIELD OF THE INVENTION

The present invention relates to a method and system for separating particulate matter, such as drill cuttings produced by well digging, tunneling, and horizontal drilling, based on particle size and/or density of the matter.

BACKGROUND OF THE INVENTION

In rotary drilling operations, a fluid commonly called "drilling mud" is circulated into and out of the hole being drilled. Drilling mud is used to control subsurface pressures, lubricate the drill bit, stabilize the well bore, and carry the cuttings to the surface, among other functions. In a typical drilling mud circulation system, drilling mud is circulated down a drill string, i.e. a pipe and tool configuration, directed through openings in a drill bit on the lower end of the drill pipe, and returned to the surface through the annular space between the drill string and the walls of the hole and a casing. As the drill bit grinds rocks into drill cuttings, the resulting debris, including sand, gravel, clay, and other particulate matter, is typically transported out of the hole to clean the debris prior to discarding the debris and to further separate any hydrocarbon material from the drilling mud.

It is known in the art to process the drill mud and drill cuttings mixture by directing the return drill mud mixture through shakers, screens, centrifuges, and fluidized beds to separate the cuttings from the drill mud before returning the drill mud to a storage area for reuse and to discard the drill cuttings. It is desirable, not only to remove the larger more coarse particles from the drill mud and cuttings mixture, but also to further remove as many fine solids as possible because these particles tend to interfere with drilling performance.

However, numerous deficiencies exist with respect to these known devices. Shaker screens are especially prone to clogging and wear, especially when drilling into clay. Cyclones are also prone to wear and require a significant amount of pump energy. Centrifuges, as well as shaker screens and cyclones, are generally unable to adequately separate clays from sand and gravel. These deficiencies exist with the use of such devices to separate drill cuttings from drill mud and to clean the separated cuttings, but such deficiencies also exist with the use of these devices to separate cement from sand, separate various minerals from one another, and other solid/solid or solid/fluid separations.

Moreover, while a number of other stand-alone separation devices are known, such devices are incapable of continuously separating particulate matter and continuously removing the separated particles from the separation device. Still another deficiency with such prior art devices is that they generally require the addition of a significant amount of fluid in order to separate the solid material, thereby increasing the costs of such separation.

Accordingly, there is a substantial need for a method and system that is efficient, cost effective, and environmentally safe, and that can be performed in a continuous mode to separate particulate matter based on particle size and/or density with a minimal amount of added fluid.

SUMMARY OF THE INVENTION

The present invention provides a system and method for continuously separating particulate matter based on particle size and/or density. The present invention works to separate drill cuttings from drill mud and to clean the drill cuttings by further removing liquid from the drill cuttings and separating the drill cuttings into its different components, i.e. sand, gravel, and clay, based on the difference in particle size and/or density of the solids. The present invention also works well to separate other solids, including but not limited to, the handling of waste materials, separating one mineral from a second mineral, separating sand and gravel from cement, and to separate any other two or more solids having different particle sizes and/or densities.

In one aspect of the present invention, there is provided at least a substantially continuous method for separating particulate material based on particle size and/or density of the material. The method comprises:

a) introducing a material comprising at least two solids having at least one of a different particle size and a different density into an inlet compartment;

b) directing said material from said inlet compartment to a separation chamber having an interior surface and an inner tube having an exterior surface, wherein an annular space is defined between the exterior surface of the inner tube and the interior surface of the separation chamber;

c) providing at least a bottom portion of said separation chamber within a cavity of a rotatable compartment;

d) maintaining a fluid within said cavity and above a level of a bottom edge of said separation chamber;

e) maintaining said separation chamber under a substantially negative pressure;

f) separating said solids based on at least one of particle size and density of the solids by flowing said fluid in an upward direction through said material in said separation chamber at a predetermined velocity, and wherein relatively larger and/or denser solids of said material are directed toward a bottom portion of said separation chamber and wherein relatively smaller or less dense solids of said material are directed upward through said annular space of said separation chamber;

g) rotating said rotatable compartment so as to enable removal of the relatively larger or denser solids from said rotatable compartment; and h) directing said relatively smaller or less dense solids to an outlet of said separation chamber, wherein the predetermined velocity of the fluid is modifiable by varying a cross-sectional area of the annular space.

In another embodiment of the present invention, there is provided a system for separating particulate material based on particle size and/or density of the material. The system comprises:

an inlet for receiving a material comprising at least two solids having at least one of a different particle size and a different density;

a separation chamber having an interior surface and an inner tube having an exterior surface that receives said material from said inlet, wherein an annular space is defined between the exterior surface of the inner tube and the interior surface of the separation chamber;

a rotatable compartment having a cavity for receiving at least a bottom portion of said separation chamber and a fluid;

a suction pump for applying negative pressure to classify the material through the annular space of the separation chamber, said suction pump enabling the separation of said solids based on particle size and/or density of the solids by drawing said fluid in an upward direction through said material and separation chamber at a predetermined velocity, wherein relatively larger or denser solids of said material are directed to a bottom portion of said separation chamber; and wherein relatively smaller or less dense solids of said material are directed upward through said annular space of said separation chamber;

wherein rotation of said rotatable bowl enables removal of the relatively larger and/or denser solids from said rotatable compartment, and wherein the predetermined velocity of the fluid is modifiable by varying a cross-sectional area of the annular space.

In yet another aspect of the present invention, there is provided at least a substantially continuous method for separating particulate material based on particle size and/or density of the material, comprising:

a) introducing a material comprising at least two solids having at least one of a different particle size and a different density into an inlet compartment having a diameter defining a pathway;

b) directing said material through said pathway to a separation chamber having an interior surface and an inner tube having an exterior surface, wherein an annular space is defined between the exterior surface of the inner tube and the interior surface of the separation chamber;

c) providing at least a bottom portion of said separation chamber within a cavity of a rotatable compartment;

d) maintaining said separation chamber under a negative pressure;

e) maintaining a predetermined amount of fluid within said cavity and within said separation chamber, wherein said maintaining step (e) comprises:
  (i) inputting a predetermined amount of fluid into a reservoir;
  (ii) directing a predetermined amount of fluid from said reservoir to said separation chamber;
  (iii) drawing a predetermined amount of fluid from said separation chamber by said negative pressure;

f) monitoring the level of the fluid in at least one of the reservoir and the separation chamber, wherein if said fluid is less than a predetermined amount in said monitoring step, performing one or more steps selected from the group consisting of:
  (i) increasing an amount of fluid directed into said separation chamber;
  (ii) increasing an available pathway of the input compartment; and
  (iii) reducing an amount of said negative pressure.

and wherein, if said fluid is more than a predetermined amount in said monitoring step (f), performing one or more steps selected from the group consisting of:
  (i) decreasing an amount of fluid directed into said separation chamber;
  (ii) decreasing an available pathway of the input compartment; and
  (iii) increasing an amount of said negative pressure.

In still another aspect of the present invention, there is provided a system for continuously separating particulate material based on particle size and/or density of the material. The system comprises:

an inlet compartment having a pathway for receiving a material comprising at least two solids having at least one of a different particle size and a different density;

a separation chamber having an interior surface and an inner tube having an exterior surface for receiving said material from said inlet compartment, wherein an annular space is defined between the exterior surface of the inner tube and the interior surface of the separation chamber;

a rotatable compartment having a cavity for receiving at least a bottom portion of said separation chamber;

a pump for directing a predetermined amount of fluid from a reservoir to said separation chamber;

a suction pump for maintaining the separation chamber under a negative pressure and for drawing a predetermined amount of fluid from said cavity through said separation chamber and out said separation chamber;

at least one sensor for monitoring the level of the fluid in at least one of the reservoir and in the separation chamber;

a control system adapted to perform one or more of increasing an amount of fluid directed into said separation chamber, increasing an available pathway of the input compartment, and reducing an amount of said negative pressure if said at least one sensor detects that the amount of fluid is less than a predetermined amount in said reservoir and/or said separation chamber;

wherein said control system is adapted to perform one or more of decreasing an amount of fluid directed into said separation chamber, decreasing an available pathway of the input compartment, and increasing an amount of said negative pressure if said at least one sensor detects that the amount of fluid is more than a predetermined amount in said reservoir and/or said separation chamber.

It is contemplated that any of the embodiments of the present invention described herein may be continuous, substantially continuous, or batch processes and systems.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION OF THE PREFERRED EMBODIMENT

Figure 1:
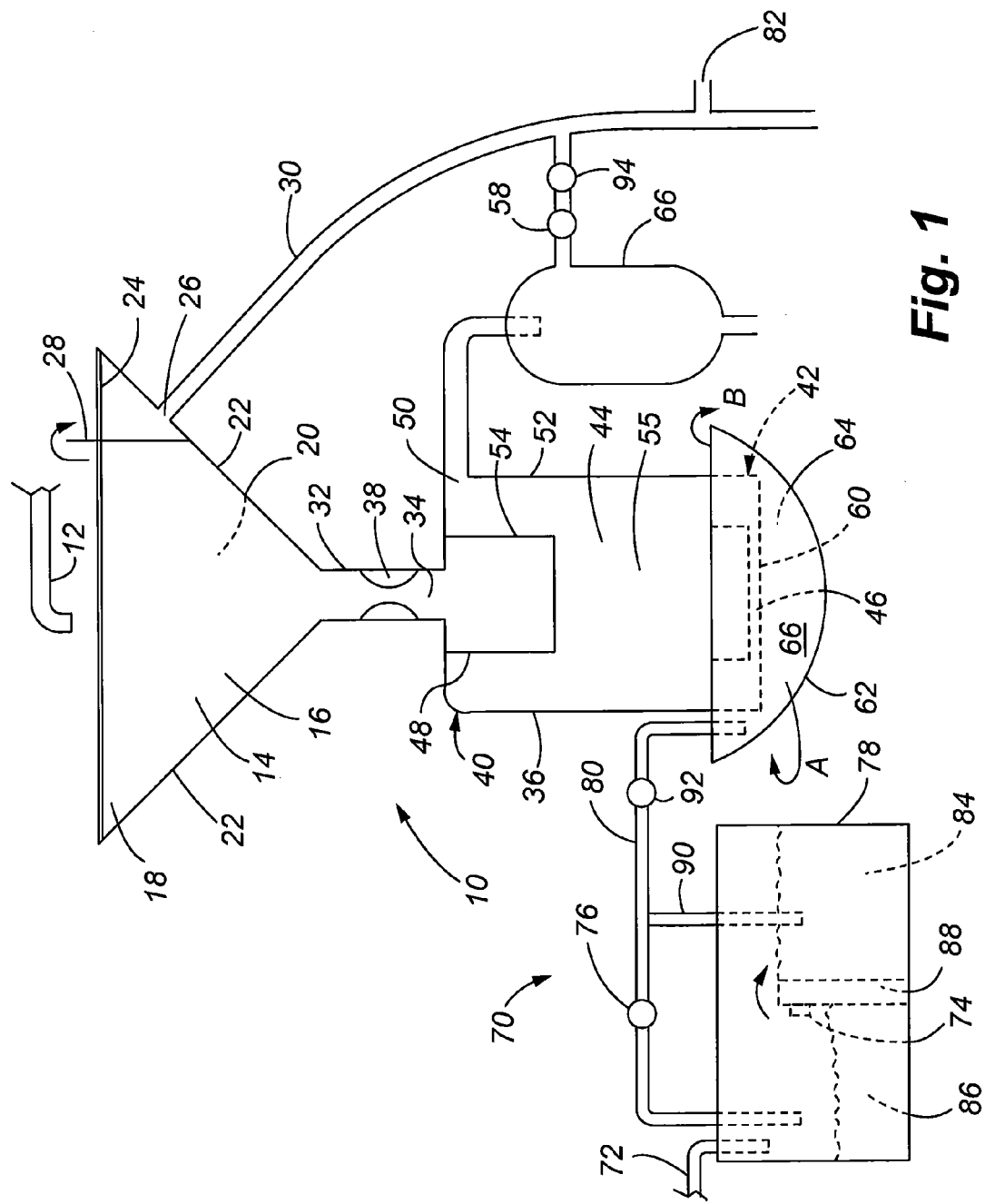
FIG. 1 depicts the components used to separate particulate matter based on the particle size and/or density of the matter in accordance with the present invention.

Referring now to the drawings, FIG. 1 illustrates one embodiment of the system for separating particulate matter based on the particle size and/or density of the particulate matter in accordance with the present invention. Though FIG. 1 depicts a system for separating drill cuttings produced by well digging, tunneling, and horizontal drilling from drill mud and further separating the drill cuttings based on particle size and/or density of the solids, the material to be separated by the method and system of the present invention may also include, but is not limited to, any other matter having at least two solids of a different particle size and/or density. In another embodiment, the present invention may be utilized to separate cement from sand and gravel. In yet another embodiment, the present invention may be utilized to remove fine clay particles from other particulate matter. In yet another embodiment, the present invention may be utilized to separate minerals having different densities, such as gold from silica. Further, the system and method of the present invention may separate any combination of solids having at least two solids of a different particle size and/or density.

Typically, as shown in FIG. 1, there is provided a separation system 10 having an input, such as pipe 12, for introducing a material having at least two solids of a different particle size and/or density, for example, a mixture of drill cuttings and drill mud transported from a hole, into an input compartment 14. The incoming material may also include a quantity of liquid that may also be separated from the solids in the present invention. Alternatively, tubing, a conveyor, or any other suitable structure may be utilized to introduce the matter into the conical culling tank.

In a drill mud operation, the material to be separated is typically introduced at a relatively high flow rate into the input compartment 14, for example, about 300 gallons per minute. It is therefore generally desirable to reduce the velocity of the material being input so as to facilitate the separation of the particulate matter. To accomplish this, in one embodiment, as shown in FIG. 1, input compartment 14 comprises a conical culling tank 16 having an upper portion 18 and a funnel-shaped cavity 20. Thus, as the material is introduced into conical culling tank 16, the sloped sides 22 of funnel-shaped cavity 20 aid in reducing the velocity of the material and change the flow of the incoming material from a turbulent flow to a substantially laminar flow.

In addition, the conical culling tank 16 may also include at least one, and preferably two or more concentric baffles, such as screens 24, disposed one above the other to aid in reducing the velocity of the material entering separation system 10 and in changing the flow of the incoming material from a turbulent flow to a laminar flow. As material is introduced into conical culling tank 16, the material preferably substantially uniformly flows over a top portion of a first screen and thereafter falls vertically on a second screen (if a second screen is used). This substantially uniform flow not only reduces the velocity of the input material, but also provides uniform settling of the material throughout a volume of conical culling tank 16. The size of the apertures of the screens is typically sufficient so as not to promote bridging of the apertures. Alternatively, any other structure that will reduce the velocity of the flow of the input material into the separation chamber discussed below may be utilized.

As material to be separated is introduced into conical culling tank 16, the larger coarse particles, namely clays, sand, and gravel, flow downward toward an outlet opening 26 in conical culling tank 16 while the comparatively liquid material, such as the drill mud, flows upward toward an upper portion 18 of the cavity 20 of conical culling tank 16. In one embodiment, conical culling tank 16 includes an annular weir ring 28 of a predetermined height extending at least substantially around the top circumference of conical culling tank 16 such that when the amount of material filling conical culling tank 16 is greater than the predetermined height, the material that is substantially drill mud and/or liquid overflows the weir ring 28 and is directed into a trough (not shown) which leads to a drill mud return feed 30 to be returned for use in the hole or other storage location. It is contemplated that this drill mud overflowing the weir ring 28 can be combined with additional additives, for example conditioners and suspension agents if desired, and may be combined any other drill mud recovered from the separation system 10 as discussed below, prior to being returned to the hole. In a typical drill mud application, a substantial portion of the material introduced into conical culling tank 16 may overflow the weir ring 28 and be directed into drill mud return feed 30. In one embodiment, from about 50% to about 95%, and preferably from about 75% to about 95%, of the volume of material introduced may overflow the weir ring 30 and be returned to the hole as drill mud. The majority of the solids, however, settle in the conical culling tank such that the material overflowing weir ring 30 has a minimal amount of drill cuttings, comprises substantially drill mud, and may be returned down the hole as drill mud with or without modification.

From the outlet opening of conical culling tank 16, the solid particulates (clays, sand, and gravel) to be separated and any liquid in the material continue to flow through a flow restriction tube 32 having an internal diameter 34. Flow restriction tube 32 defines an inlet to a separation chamber 36 as will be discussed below. By varying the diameter of flow restriction tube 32 or by adjusting internal diameter 34 of flow restriction tube 32, the amount of material entering separation chamber 36 can be controlled. To accomplish such control, typically flow restriction tube 32 is provided with a flow restriction valve 38. Flow restriction valve 38 may be pneumatically controlled, mechanically controlled, i.e. a ball valve, or controlled by any other suitable method. Further, flow restriction valve 38 may fully close off internal diameter 34 of flow restriction tube 32, may fully open a substantial portion of internal diameter 34 of flow restriction tube 32, or may incrementally adjust the available internal diameter 34 through which material can flow.

From flow restriction tube 32, the solids to be classified along with any liquid in the material flows into separation chamber 36 having an upper portion 40, a lower portion 42, and an internal cavity 44. Lower portion 42 of separation chamber 36 includes an opening 46, and preferably has a substantially has an open bottom face, to enable fluid to enter the cavity when the cavity is under negative pressure. The fluid flows upward at a predetermined velocity, and preferably at a predetermined linear velocity, through the material in separation chamber 36 to continuously or substantially continuously separate/classify the solids based on particle size and/or density of the solids, to separate the solid material from liquid, and to enable the continuous removal of the larger solids from the system as will be discussed in detail below. The velocity of the fluid is critical in determining the rate of solids separation and the degree to which the solids are separated.

In addition, separation chamber 36 includes an inner concentric tube 48 that extends from an upper portion 40 of separation chamber 36 down into cavity 44 of separation chamber 36. Preferably, inner tube 48 has a length that is less than about 50% of the length of the separation chamber 36. In this way, a separation zone 55 within separation chamber 36 is created within which material being input into separation chamber 36 from flow restriction tube 32 can be continuously separated by fluid traveling in a counter-flow to the flow of the material. Separation chamber 36 also includes an outlet 50 at upper portion 40 of separation chamber 36. At least a substantial portion of the solids entering separation chamber 36 flow through an internal passageway or diameter of inner tube 48. To separate these incoming solid materials based on particle size and/or density of the material, a negative pressure is maintained in separation chamber 36, including an annular space 56 between an exterior 52 of the inner tube 48 and an interior 54 of a separation chamber wall.

To provide internal cavity 44 of separation chamber 36 with a negative pressure, in one embodiment of the present invention, a suction pump 58 is provided downstream from separation chamber 36. Suction pump 58 applies a suction force to the separation chamber 36, including annular space 56. In addition, a bottom face 60 of separation chamber 36 having opening 46 is disposed within a cavity of a rotatable compartment filled with fluid. Preferably, the rotatable compartment is a rotatable bowl 62 having a cavity 64 filled with a fluid 66. As herein, "fluid" refers to any liquid, gas, semi-solid, or semi-liquid material that can facilitate separation of the solids. Preferably, the fluid utilized in the present invention to facilitate separation is water. Preferably also, during operation, the fluid level in the bowl is maintained during operation to at least bottom face 60 of separation chamber 36 so as to create an annular p-trap that substantially maintains fluid 66 in the cavity of the rotatable bowl during operation and substantially prevents the fluid from spilling over the upper edges of the bowl during operation.

The negative pressure provides sufficient draw to force fluid 66 from cavity 64 of rotatable bowl 62 up through the solids in separation chamber 36 and out through the outlet 50 of separation chamber 36 at a predetermined velocity, for example a linear velocity. As fluid 66 is being forced through the material in the separation chamber at the predetermined velocity, and preferably at a predetermined linear velocity, the solids are separated based on the difference in particle size and/or density of the solids. The finer, less dense particulates and fluid, including liquid from the material, are directed upward through annular space 56 and separation chamber 36 while the larger, denser particulates are continuously directed downward into lower portion 42 of separation chamber 36 and into cavity 64 of bowl 62. The rotatable bowl 62 can continuously rotate or rotate as needed to remove the larger, coarser, and substantially dewatered materials from the system on a continuous basis. Typically, a motor is provided to drive the rotation of the bowl in the direction shown by arrow A, but any other suitable structure for rotating the bowl can be used.

In one embodiment, the rate of solids removal from bowl 62 can be increased by providing at least one, and preferably at least two, stationary blades (not shown) on a bottom of the separation chamber 36 (not shown). The blades are positioned in a space between the separation chamber 36 and rotatable bowl 62. In addition, it is contemplated that placing the rotation of the blades relatively off-center as compared to the separation chamber 36 will increase the solids removal rate from the bowl.

Solids spilling out of the bowl 62 in the direction shown by arrow B, for example, may be collected by any suitable structure, such as a drop box with a filter screen and drain pipe at the bottom of the box. Any fluid in the collected solids may be further removed by any suitable method or structure. In one embodiment, the coarser solids in bowl 62 are merely need to make less than about a 90 degree change from its angle of entry into bowl and its angle of removal from bowl 62.

By varying the velocity of the fluid in the present invention, the separation and classification of solids may be controlled. For example, if it desired to separate finer particulate matter, the velocity of the fluid moving upward through the separation chamber should be decreased. On the other hand, to separate larger particulate matter, the velocity of the fluid should be increased. Two principal methods of increasing the velocity, and preferably the linear velocity, in the present invention are to increase the draw of the suction pump on the separation chamber, particularly the annular space of the separation chamber, thereby increasing the velocity that the fluid moves through and separates the solids. A second method of varying the velocity of the fluid and varying the degree of separation of the particles can be achieved by varying the diameter of the annular space in the separation chamber.

In one embodiment, annular space 56 is approximately equal to the difference between the cross-sectional area of separation chamber 36 and the cross-sectional area of the inner concentric tube 48. To reduce the velocity of the fluid, the cross-sectional area of annular space 56 can be increased, typically by reducing the inner diameter of the inner concentric tube 48 used in the invention. Alternatively, annular space 56 can be decreased, typically by increasing the inner diameter of the inner concentric tube 48 to increase the velocity. Typically, the separation of larger particles requires a higher velocity. In addition, varying the height of the separation chamber can influence the separation. For example, a relatively taller separation chamber and annular space will provide more area through which solids undergo separation, thereby resulting in the separation of finer particulate solids and increasing the degree of separation.

As fluid 66 moves upward through the material in separation chamber 36 from rotatable bowl 62, the larger or more dense solids begin to flow toward a bottom portion 42 of the separation chamber 36 and into cavity 64 of the rotatable bowl 62 while the lighter or less dense materials flow toward an upper portion of separation chamber 36. Thus, as the fluid moves from the bowl up through the solids in the separation chamber 36, the ease of dewatering the solids also increases as the solid particle size increases.

In a drill mud application, typically, the volume of larger, coarser solids, for example, sand and gravel, continuously increases in the cavity of rotatable bowl 66 and until such time as the volume of sand and gravel overflow the capacity of the rotatable bowl. When the volume of sand and gravel can no longer be maintained within the bowl, the rotation of the bowl removes the separated sand and gravel from the bowl by spilling the material over an edge of the bowl. This continuous removal of the coarser solids enables the present invention to run in a continuous manner. In other words, neither operation of the system nor the method need be stopped at any time in order to discard the larger classified solids or other materials. The rate that drill cuttings or other solid materials can be processed is also dependent on the amount of material being introduced through the flow restriction tube, as well as the speed and frequency of rotation of the bowl at the bottom of the separation chamber. The finer particulates, for example, fine clays and fluid 66 and at least a portion of any liquid in the input material will flow upward through separation chamber 36 through annular space 56 and out through outlet 50 of classification chamber 38.

In one embodiment, these fine clays and fluid can be directed to a settling tank 68 to further separate the fine clays from the fluid. Because the fluid in separation chamber 36 has diluted the drill mud, the drill mud generally does not include the quantity of suspension agents to maintain the clays in the drill mud solution. As a result, the clays will readily settle out of the fluid in settling tank 68. Typically, settling tank 68 includes sidewalls having at least a sloped portion 70 and a pump or other suitable structure (not shown) for delivering the fine clays out of settling tank 68 to be collected or to be further treated by a centrifuge or other dewatering device. Suction 58 pump is also typically also located downstream of settling tank 68 and provides a negative pressure to the interior of the settling tank 68. In this way, fluid, including mainly depleted drill mud, may be removed from settling tank 68 and directed to the drill mud return feed 30. An additional benefit of the present invention is that this depleted is substantially free of particulates that could harm or damage suction pump 58. Additional additives, such as conditioning agents and suspension agents can be added to the drill return feed at feed 82 if necessary prior to recirculating the drill mud back to the hole or prior directing to directing the drill mud to storage.

It is a particular aspect of the present invention that the system and method of the present invention can be operated so as continuously process drill mud and drill cuttings returned from a drill hole. To do so, it is critical that the mass balance of the fluid be maintained in the system at all times.

Preferably, the fluid used in the present invention is water although any other suitable liquid, gas or semi-solid may be used. Preferably, the fluid that is one that does not dissolve the solids. To maintain the mass balance of water in the system, there is provided a fluid control system that regulates the amount of fluid entering and exiting the system. In addition, in one embodiment, the fluid control system communicates with the flow restriction valve to account for and control the amount of fluid entering the system with the material to be separated, for example, fluid in the drill mud when processing drill mud and drill cuttings.

As shown in FIG. 1, fluid control system 70 includes a water make-up feed 72, a level sensor 74, a delivery pump 76, a fluid reservoir 78, and a siphon tube 80. Water make-up feed 72 is adapted to provide fluid, typically water, as necessary to the separation fluid reservoir 78. Typically, the fluid is provided to the water make-up feed 72 by a pump or any other suitable structure. Any suitable storage device, such as a reservoir, can be provided to store the make-up fluid (preferably water). The make-up feed 72 can deliver fluid to separation fluid reservoir 78 as needed to maintain a predetermined level of water in the reservoir. From the reservoir, delivery pump 76 provides fluid 66 as needed or continuously out of reservoir 78 through siphon tube 80 having an output 82 that empties into a rotatable compartment, preferably rotatable bowl 62.

In one embodiment, delivery pump 76 is a circular pump having a reservoir 82 with a first compartment 84, a second compartment 86, and a standing pipe 88 therebetween. As fluid is delivered from first compartment 84 of fluid reservoir 78 to siphon tube 80 and to rotatable bowl 62, some of the fluid also is directed by a pipe 90, tube, or any other suitable structure into the second compartment of fluid reservoir 78. As the fluid fills up in second compartment 86, the fluid flows over standing pipe 88 and back into first compartment 84.

Generally, it is desirable that the amount of fluid being pumped into rotatable bowl 62 be substantially equal to the amount of fluid being drawn out of the separation system 10 by suction pump 58. When this amount is not equal, the present invention includes a control system for control of various components so as to maintain the desired amount of fluid for optimal separation of the solids in the separation chamber. In one embodiment, fluid control system 70 includes a first flow sensor 92 downstream from delivery pump 76 and a second flow sensor 94 downstream from suction pump 58. If the flow of fluid is not equal at the flow sensors, proper adjustments can be made by the present invention. Alternatively, any other suitable device can be used to determine whether the amount of fluid entering the classification chamber is substantially equal to the amount of material exiting the system. Those proper adjustment include, but are not limited to, reducing the flow rate of the delivery pump, reducing the pull of the suction pump, closing the restriction valve such that no more material can be introduced into the separation chamber, opening the restriction valve, or incrementally adjusting the available diameter of the flow restriction tube through which material can flow.

In one embodiment, the flow control system includes a control device, such as a microprocessor, a PID controller, or the flow sensors described previously for comparing the input flow from delivery pump 76 to outlet flow from classification chamber 36 created by suction pump 58. If the control device determines that one or more of the above adjustments need to be made, the control device will generate a signal and communicate with the components requiring adjustment, such as the delivery pump, flow restriction valve, and/or suction pump. Generally, if a positive displacement pump is utilized in the present invention, the need for a flow sensor is obviated since the output of the pump is already known and the information conveyed to the component requiring adjustment or to the control device. Thus, if the flow rate cannot be determined by the delivery pump, suction pump, or other device, a flow sensor can be used to determine the input or output flow rate.

A level sensor 74 in reservoir 78 can further assist in determining when suitable adjustments are necessary so as to keep the system and method operating continuously. For example, if level sensor 74 detects that there is an insufficient amount of fluid in the reservoir 78, proper adjustments can be made to increase the amount of fluid input into the separation system 10. For example, insufficient fluid in the fluid may signify that much more fluid from the separation chamber 36 is being removed that is being input into the separation chamber. Thus, suction pump 58 can be slowed down and/or flow restriction tube 32 can be opened to allow more material having fluid into the separation chamber 36. In addition, delivery pump 76 can increase its flow rate to add fluid to the system 10 while more fluid is introduced into reservoir 78 from make-up feed line 72, if necessary.

Alternatively, if too much fluid is in the system 10, including separation chambers 36, generally, the extraneous fluid will first overflow rotatable bowl 62. However, additional fluid may begin to flow from rotatable bowl 62 back through siphon tube 80 and into second compartment 86 of reservoir 78. Generally, this fluid will contain particulate matter and thus such backflow of this material is not desirable. At this point, it may be desirable to reduce the flow rate of delivery pump 76 lower such that more fluid is being drawn out of separation chamber 36 by siphon pump 58 than is being input by delivery pump 76. Further, it may be desirable to substantially close the pathway of restriction tube 32 by way of flow restriction valve 38 to prevent further fluid from entering separation chamber 36 until the desired amount of fluid is again achieved. Any suitable mechanism known in the art, such as a microprocessor or feedback loop, can be utilized to communicate the adjustments from one component to another in the system.

The foregoing description of the present invention has been presented for purposes of illustration and description. Furthermore, the description is not intended to limit the invention to the form disclosed herein. Consequently, variations and modifications commensurate with the above teachings and skill and knowledge of the relevant art are within the scope of the present invention. The embodiments described herein above are further intended to explain best modes of practicing the invention and to enable others skilled in the art to utilize the invention in such, or other embodiments with various modifications required by the particular application(s) or use(s) of the present invention. It is intended that the appended claims be construed to include alternative embodiments to the extent permitted by the prior art.

I claim:

1. A substantially continuous method for separating particulate material based on particle size and/or density of the material, comprising:
   a) introducing a material comprising at least two solids having at least one of a distinct particle size and density into an inlet compartment;
   b) directing said material from said inlet compartment to a separation chamber having an interior surface and at least one opening on a face thereof, and an inner tube having an exterior surface, wherein an annular space is defined between the exterior surface of the inner tube and the interior surface of the separation chamber;

c) providing at least a bottom portion of said separation chamber within a cavity of a rotatable compartment;

d) maintaining a fluid within said cavity and above a bottom edge of said separation chamber;

e) maintaining said separation chamber under a substantially negative pressure;

f) separating said solids based on at least one of particle size and density of the solids by flowing said fluid in an upward direction through said material in said separation chamber at a predetermined velocity, wherein relatively larger and/or denser solids of said material are directed toward a bottom portion of said separation chamber and into said rotatable compartment, and wherein relatively smaller or less dense solids of said material are directed upward through said annular space of said separation chamber and out an outlet of said separation chamber;

g) rotating said rotatable compartment so as to enable removal of the relatively larger or denser solids from said rotatable compartment; and h) directing said relatively smaller or less dense solids to an outlet of said separation chamber, wherein the predetermined velocity of the fluid is adjustable by varying a cross-sectional area of the annular space.

2. The method of claim 1, wherein said inlet compartment is funnel-shaped and further comprises an outlet and a flow restriction tube associated with said outlet, said flow restriction tube adapted to deliver said material to said separation chamber at a predetermined rate.

3. The method of claim 2, wherein said flow restriction tube has an adjustable internal diameter, and wherein the rate said material is introduced into said separation chamber may be adjusted.

4. The method of claim 1, further comprising providing said inlet compartment with at least one baffle to reduce the flow rate of said material being introduced into said inlet.

5. The method of claim 1, wherein said maintaining a negative pressure within said separation chamber comprises operatively interconnecting a suction pump to said separation chamber, wherein said suction pump is capable of modifying the velocity of the fluid moving through said separation chamber.

6. The method of claim 1, wherein a volume of material being introduced into said separation chamber is substantially equal to a volume of material being removed from said separation chamber.

7. The method of claim 1, wherein said maintaining a fluid within said cavity comprises introducing a fluid into said rotatable compartment to maintain a predetermined fluid level in said rotatable compartment.

8. The method of claim 1, wherein said material further comprises a liquid component, and wherein during said step of introducing, at least about 50% of the liquid component overflows an annular weir extending substantially around a circumference of the inlet compartment.

9. A system for separating particulate material from a fluid, based on particle size and/or density of the material, comprising:

an inlet compartment for receiving a material comprising at least two solids having at least one of a distinct particle size and density;

a separation chamber having an interior surface and an inner tube having an exterior surface that receives said material from said inlet compartment, wherein an annular space is defined between the exterior surface of the inner tube and the interior surface of the separation chamber;

a rotatable compartment having a cavity for receiving at least a bottom portion of said separation chamber and the fluid;

a suction pump interconnected to said separation chamber for applying negative pressure to separate the material through the separation chamber, said suction pump enabling the separation of said solids based on particle size and/or density of the solids by drawing said fluid in an upward direction through said material and separation chamber at a predetermined velocity, wherein relatively larger or denser solids of said material are directed to a bottom portion of said separation chamber and into said rotatable compartment, and wherein at least one of relatively smaller or less dense solids of said material are directed upward through said annular space of said separation chamber and out an outlet of said separation chamber;

wherein rotation of said rotatable compartment enables removal of the relatively larger and/or denser solids from said rotatable compartment; and wherein the predetermined velocity of the fluid is adjustable by varying a cross-sectional area of the annular space.

10. A substantially continuous method for separating particulate material based on particle size and/or density of the material, comprising:

a) introducing a material comprising at least two solids having at least one of a different particle size and a different density into an inlet compartment having an internal diameter defining a pathway;

b) directing said material through said pathway to a separation chamber having an interior surface and at least one opening provided therein, and an inner tube having an exterior surface, wherein an annular space is defined between the exterior surface of the inner tube and the interior surface of the separation chamber;

c) providing at least a bottom portion of said separation chamber within a cavity of a rotatable compartment;

d) maintaining said separation chamber under a negative pressure;

e) maintaining a predetermined amount of fluid within said cavity and within said separation chamber, wherein said maintaining a predetermined amount of fluid comprises:

(i) inputting a predetermined amount of fluid into a reservoir;

(ii) directing a predetermined amount of fluid from said reservoir to said separation chamber;

(iii) drawing a predetermined amount of fluid from said separation chamber by said negative pressure;

f) monitoring the level of the fluid in at least one of the reservoir, cavity and the separation chamber, wherein if said fluid is less than a predetermined amount in said monitoring the level of the fluid, performing one or more steps selected from the group consisting of:

(i) increasing an amount of fluid directed from said reservoir into said separation chamber;

(ii) increasing an available pathway of the input compartment; and (iii) reducing an amount of said negative pressure;

and wherein, if said fluid is more than a predetermined amount in said monitoring the level of the fluid, performing one or more steps selected from the group consisting of:

(i) decreasing an amount of fluid directed from said reservoir into said separation chamber;

(ii) decreasing an available pathway of the input compartment; and (iii) increasing an amount of said negative pressure.

11. A system for separating particulate material based on particle size and/or density of the material, comprising:
an inlet compartment having a pathway for receiving a material comprising at least two solids having at least one of a different particle size and a different density;
a separation chamber having an interior surface and at least one opening therein, and an inner tube having an exterior surface for receiving said material from said inlet compartment, wherein an annular space is defined between the exterior surface of the inner tube and the interior surface of the separation chamber;
a rotatable compartment having a cavity for receiving at least a bottom portion of said separation chamber;
a pump interconnected to said separation chamber for directing predetermined amount of fluid from a reservoir to said separation chamber;
a suction pump interconnected to said separation chamber for maintaining the separation chamber under a substantially negative pressure and for drawing a predetermined amount of fluid from said cavity through said separation chamber and out said separation chamber;
at least one sensor for monitoring the level of the fluid in at least one of the reservoir, cavity, and the separation chamber;
a control system adapted to perform one or more of increasing an amount of fluid directed from said reservoir into said separation chamber, increasing the diameter of said pathway of the input compartment, and reducing an amount of said negative pressure if said at least one sensor detects that the amount of fluid is less than a predetermined amount in at least one of said reservoir, cavity, and separation chamber
and to perform one or more of decreasing an amount of fluid directed from said reservoir into said separation chamber, the diameter of said pathway of the input compartment, and increasing an amount of said negative pressure if said at least one sensor detects that the amount of fluid is more than a predetermined amount in at least one of said reservoir, cavity, and separation chamber.

12. The method of claim 1, wherein said maintaining a fluid within said cavity comprises:
(i) inputting a predetermined amount of fluid into a reservoir;
(ii) directing a predetermined amount of fluid from said reservoir to said cavity and at least a portion of said separation chamber;
(iii) drawing a predetermined amount of fluid from said cavity through said at least a portion of said separation chamber by said substantially negative pressure.

13. The method of claim 12, further comprising monitoring the level of the fluid in at least one of said reservoir, rotatable compartment, and separation chamber, wherein if said fluid is less than a predetermined amount in said monitoring step, performing one or more steps selected from the group consisting of:
(i) increasing an amount of fluid directed from said reservoir into said cavity and into at least a portion of said separation chamber;
(ii) increasing an available pathway of said input compartment; and
(iii) reducing an amount of said substantially negative pressure;
and wherein, if said fluid is more than a predetermined amount in said monitoring step, performing one or more steps selected from the group consisting of:
(i) decreasing an amount of fluid directed from said reservoir into said cavity and into at least a portion of said separation chamber;
(ii) decreasing an available pathway of the input compartment; and
(iii) increasing an amount of said negative pressure.

14. The system of claim 9, wherein at least a portion of said inlet compartment is funnel-shaped and further comprises an outlet and a flow restriction tube associated with said outlet, said flow restriction tube adapted to deliver said material to said separation chamber at a predetermined rate.

15. The system of claim 14, wherein said flow restriction tube has an adjustable internal diameter, and wherein the rate said material is introduced into said separation chamber may be adjusted.

16. The system of claim 9, further comprising at least one baffle to reduce the flow rate of said material being introduced into said inlet compartment.

17. The system of claim 9, further comprising an annular weir extending substantially around a circumference of the inlet compartment.

18. The system of claim 9, further comprising:
at least one sensor for monitoring the level of the fluid in at least one of said reservoir, cavity, and separation chamber;
a control system adapted to perform at least one of increasing an amount of fluid directed into said separation chamber, increasing an available diameter of the input compartment, and reducing an amount of said negative pressure if said at least one sensor detects that the amount of fluid is less than a predetermined amount in at least one of said reservoir, cavity, and separation chamber and to perform one or more of decreasing an amount of fluid directed into said separation chamber, decreasing an available diameter of the input compartment, and increasing an amount of said negative pressure if said at least one sensor detects that the amount of fluid is more than a predetermined amount in at least one of said reservoir, cavity, and separation chamber.

19. The method of claim 10, further comprising:
separating said solids based on at least one of particle size and density of the solids by flowing said fluid in an upward direction through said material in said separation chamber at a predetermined velocity, wherein relatively larger and/or denser solids of said material are directed toward a bottom portion of said separation chamber and into said rotatable compartment, and wherein relatively smaller or less dense solids of said material are directed upward through said annular space of said separation chamber and out an outlet of said separation chamber; and
rotating said rotatable compartment so as to enable removal of the relatively larger or denser solids from said rotatable compartment.

20. The method of claim 10, wherein a portion of said inlet compartment is funnel-shaped and further comprising providing said inlet compartment with at least one baffle to reduce the flow rate of said material being introduced into said inlet compartment.

21. The method of claim 10, wherein said maintaining a negative pressure within said separation chamber comprises operatively interconnecting a suction pump to said separation chamber, wherein said suction pump is capable of modifying the velocity of the fluid moving through said separation chamber.

22. The method of claim 10, wherein said material further comprises a liquid component, and wherein during said step of introducing, at least about 50% of the liquid component overflows an annular weir extending substantially around a circumference of the inlet compartment and an outlet of said separation chamber.

23. The system of claim 11, wherein the suction pump enables the separation of said solids based on at least one of said particle size and density of the solids by drawing said fluid in an upward direction through said material and separation chamber at a predetermined velocity, wherein relatively larger or denser solids of said material are directed to a bottom portion of said separation chamber and into said rotatable compartment, and wherein relatively smaller or less dense solids of said material are directed upward through said annular space of said separation chamber and out through an outlet of said separation chamber.

24. The system of claim 11, wherein at least a portion of said inlet compartment is funnel-shaped and further comprises an outlet and a flow restriction tube associated with said outlet, said flow restriction tube adapted to deliver said material to said separation chamber at a predetermined rate.

25. The system of claim 11, further comprising at least one baffle to reduce the flow rate of said material being introduced into said inlet compartment.

26. The system of claim 11, further comprising an annular weir extending substantially around a circumference of the inlet compartment.

27. The system of claim 11, wherein said control system further comprises a processing means in communication with said at least one sensor to adjust one or more of said amount of fluid directed from said reservoir into said separation chamber; a diameter of said pathway of the input compartment, and an amount of said negative pressure.

* * * * *